United States Patent [19]
Kirby

[11] Patent Number: 6,056,223
[45] Date of Patent: May 2, 2000

[54] DRAG MOUNTED SPRING FOR SPIN-CAST REELS

[76] Inventor: Thomas Glen Kirby, 304 W. Key West, Broken Arrow, Okla. 74011

[21] Appl. No.: 09/023,004

[22] Filed: Feb. 12, 1998

Related U.S. Application Data

[63] Continuation-in-part of application No. 08/700,883, Aug. 21, 1996, abandoned.

[51] Int. Cl.$^7$ .................................................. A01K 89/00
[52] U.S. Cl. .......................... 242/306; 242/245; 242/307
[58] Field of Search ................................... 242/244, 245, 242/296, 306, 307

[56] References Cited

U.S. PATENT DOCUMENTS

| | | | |
|---|---|---|---|
| 3,697,011 | 10/1972 | Christensen et al. | 242/244 X |
| 3,741,493 | 6/1973 | Jones | 242/296 |
| 4,496,115 | 1/1985 | Kreft et al. | 242/308 |
| 4,674,698 | 6/1987 | Carpenter | 242/244 X |
| 4,696,437 | 9/1987 | Yoshikawa | 242/244 |

FOREIGN PATENT DOCUMENTS 9871  9/1909  United Kingdom ................... 242/296

*Primary Examiner*—Donald P. Walsh
*Assistant Examiner*—Emmanuel M. Marcelo

[57] ABSTRACT

A spool rotational alert spring mounted to a disk drag, for use in a fishing reel of the spin-cast type, having a body with a fixed hub for supporting a line carrying spool.

The disk drag supported non-rotatably on the hub is a unitary device that performs both the function of applying drag pressure against the wall of the spool and mounting a spool rotational alert spring with its free end engaging annularly disposed serrations on the wall of the spool, to produce an audible alarm alerting the user when the line carrying spool rotates against the disk drag that line is being withdrawn.

4 Claims, 5 Drawing Sheets

DRAG MOUNTED SPRING FOR SPIN-CAST REELS

This application is a continuation-in-part of my earlier filed U.S. application Ser. No. 08/700,883, filed Aug. 21, 1996, now abandoned.

BACKGROUND OF THE INVENTION

This invention relates to a device for mounting a spool rotational alert spring in conjunction with providing drag pressure against the wall of the spool for spin-cast reels that incorporates serrations on a wall of the spool. Spin-cast type fishing reels of past and current technology, employ a front shield or cover over a line carrying spool, whereby rotation of the spool cannot be visibly detected. The spring member coacts with the serrations on the spool to provide an audible alarm, alerting the user that rotation of the spool is occurring and that line is being withdrawn from the spool. The spring type member is generally assembled with the deck plate, body, or formed rigidly with a drag adjusting plate or spool retainer. In these arrangements the spring member in allowing for variations in dimension between the deck plate and spool becomes unnecessarily complicated to manufacture, and is often damaged if the spool is reversely rotated, and generally cannot be used interchangeably with different reels. Different means have been disclosed in the prior art of mounting spring type members. These are exemplified in part in the disclosures of Young et al. in U.S. Pat. No. 2,558,896; Hull in U.S. Pat. No. 3,416,746; Shackelford et al. in U.S. Pat. No. 4,378,914; and Kreft et al. in U.S. Pat. No. 4,496,115. While it is apparent that each of these examples of the prior art possess merit, none have addressed the problem that the present invention is expressly intended to solve. This applicant regrets that he is unable to provide examples of prior art which relate more directly to the subject matter of the present invention; however, a diligent search of the art has failed to reveal examples of the technology herein disclosed.

SUMMARY OF THE INVENTION

The present invention comprises a unitary non-rotatable disk drag that performs a dual function of providing drag pressure against the wall of a line carrying spool as well as mounting a spool rotational alert spring with its free end engageable with annularly disposed serrations on the wall of the spool, whereby upon rotation of the spool an audible alarm is produced to alert the user that line is being withdrawn from the spool. The disk drag and spool rotational spring, in accordance with the present invention, can be manufactured as separate pieces and later assembled, or integrally formed as a one piece member. The free end of the spring can project through an opening in the disk drag and engage the serrations on the spool, permitting the disk drag to have a diameter greater than that of the spool serrations. The spring is mounted to the disk drag with the free end of the spring preset to provide desired pressure against the spool serrations. With the spring mounted to the disk drag, preset spring pressure against the spool serrations remains constant as drag pressure is increased and decreased, thereby eliminating damage to the spring if reverse rotation of the spool occurs. The disk drag and spring assembly, being interchangeable from the back to the front of the spool, can be combined with a conventional drag means or combined with a second disk drag and spring. The disk drag and spool rotational alert spring assembly which is accessorial in nature for reels of current and future manufacture as tooling changes to the body, deck plate, drag adjusting plate, or spool retainer are not necessary with this invention. This disk drag and spring assembly can also be use with my earlier U.S. Pat. No. 5,518,193 further illustrating the versatility of this invention.

PREFERRED EMBODIMENTS OF THE INVENTION

Figure 1:
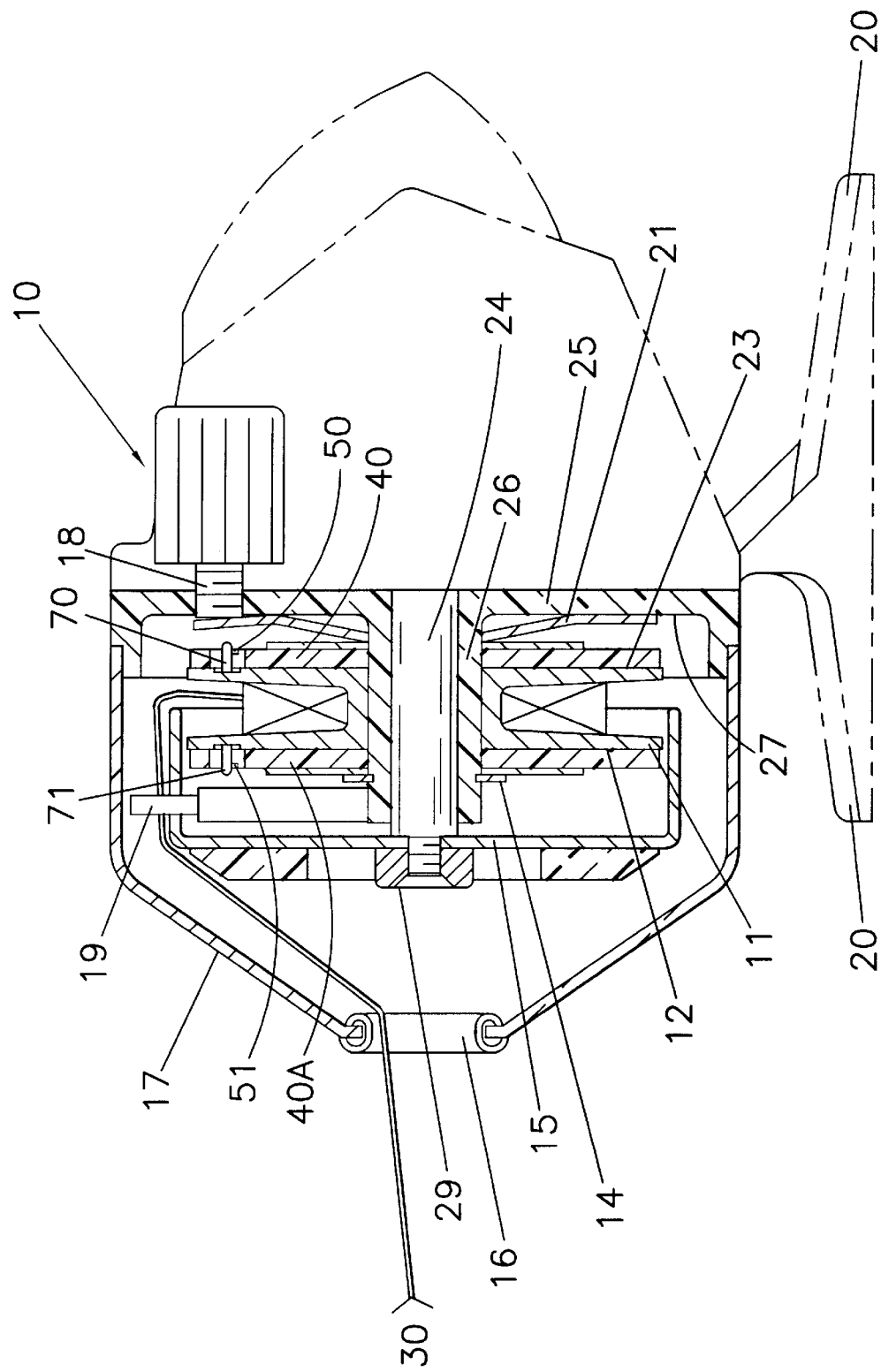
FIG. 1 is a fragmented vertical section through a spin-cast style fishing reel incorporating the invention.

Referring to the drawings in greater detail, FIG. 1, shows a spin-cast style fishing reel, generally designated 10, a reel embodying the principles of this invention. The reel includes a front shield 17, a line guide 16, and is mounted detachably on the outer periphery of the body 25, a mounting foot 20 for attachment of the reel to a fishing rod. The body 25 having a deck plate 27, attached to or formed as part of the deck plate 27 is a fixed hub 26 projecting forward of the deck plate 27, and the hub 26 having a key-way, spline or the like (not shown). A line carrying spool 11 is supported on the hub 26 for maintaining a supply of fishing line 30. The spool 11 normally having serrations arranged annularly about the surface of the rearward wall 23 or forward wall 12 or both. A removable retainer 14 on the hub 26, axially positions the spool 11 between drag means adjacent a drag adjusting plate 21. A drag adjusting mechanism 18 increases and decreases pressure on the drag adjusting plate 21. A rotatable center shaft 24 extends axially through the hub 26. A rotor 15 is secured by a nut 29 to the forward end of the center shaft 24 and at least partially longitudinally overlaps the forward wall 12 of the spool 11 best seen in FIG. 1. The center shaft 24 is attached at the rear to a gearing mechanism (not shown) which is in turn attached to a hand crank (not shown). The hand crank through the gearing mechanism, may be rotated to turn the rotor 15, this action causes a line engaging means 19 to extend outward for winding line onto the spool 11. Line 30 withdrawn causes an anti-reverse mechanism (not shown) to engage, preventing the rotor 15 from reversing directions; this action causes line 30 to be drawn over the rotor 15 whereby the normally non-rotatable spool 11 rotates against adjustable drag pressure applied to its rearward wall 23 and forward wall 12 by combined drag means to prevent line 30 breakage. All elements described to this point in this detailed description; that is, elements 10–34, are typical of commercially available spin-cast fishing reels. In these typical fishing reels, the spool serrations are engaged by a spring member (not-shown) to produce an audible alarm when the spool 11 rotates against the combined drag means as line 30 is withdrawn. These spring members are generally mounted to the drag adjusting plate 21, body 25, or the deck plate 27, whereby spring members become difficult to interchange with different reels. In these typical spin-cast reels, spring pressure against the spool serrations is unpredictable, whereby the audible alarm changes as drag pressure against the spool is increased and decreased, and reverse rotation of the spool can possibly damage the spring member.

Figure 2:
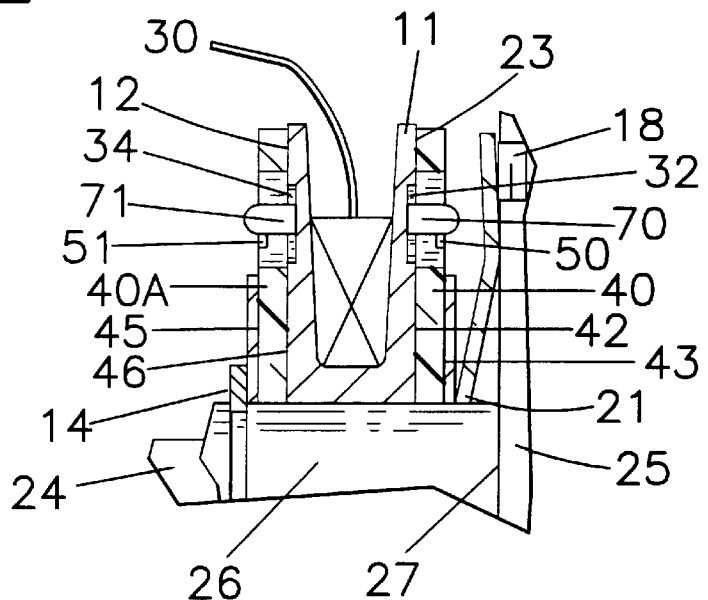
FIG. 2 is a fragmented section on an enlarged scale, of that portion of the reel incorporating the preferred embodiment of the disk drag mounted spring.

Referring to the drawings, it will be readily seen that the present invention offers a simple solution to the aforementioned problems through the provision of a disk drag 40. The disk drag may be formed of different materials, including plastic, metal, or a combination thereof, a material which is compatible with the drag action desired. The disk drag is conventionally configured for non-rotatable support on the hub 26, and has means for mounting a spool rotational alert spring 50 thereto, with the free end 70 of the spring 50 preset, engaging the spool serrations 32. The spring may be formed of different materials, including plastic, metal, or a combination thereof, a material that provides the spring action and audible alarm desired. In the illustrated arrangement of FIG. 1 and FIG. 2 the disk drag 40 having a forward face 42 and a rearward face 43 is non-rotatably supported on the hub 26 with its rearward face 43 adjacent the drag adjusting plate 21; the forward face 42 engaging the rearward wall 23 of the line 30 carrying spool 11 rotatably supported on the hub 26. The disk drag 40 having a spool rotational alert spring 50 conventionally mounted thereto with the free end 70 of the spring engaging serrations 32 on the rearward wall 23 of the spool 11. A removable retainer 14 on the hub 26 axially positioning a non-rotatable second disk drag 40A having a forward face 45 and a rearward face 46 with its rearward face 46 against the forward wall 12 of the spool 11. Said second disk drag 40A having a second spool rotational alert spring 51 conventionally mounted thereto with the free end 71 of the spring engaging serrations 34 on the forward wall 12 of the spool 11. Combined disk drags 40 and 40A applying drag pressure against the walls of the spool as adjusted by the drag adjusting mechanism 18. The spool rotates against combined disk drags, and serrations rotate against the free ends 70 and 71 of combined springs 50 and 51 as line 30 carried on the spool 11 is pulled therefrom, providing an audible alarm alerting the user that line is being withdrawn.

Figure 3:
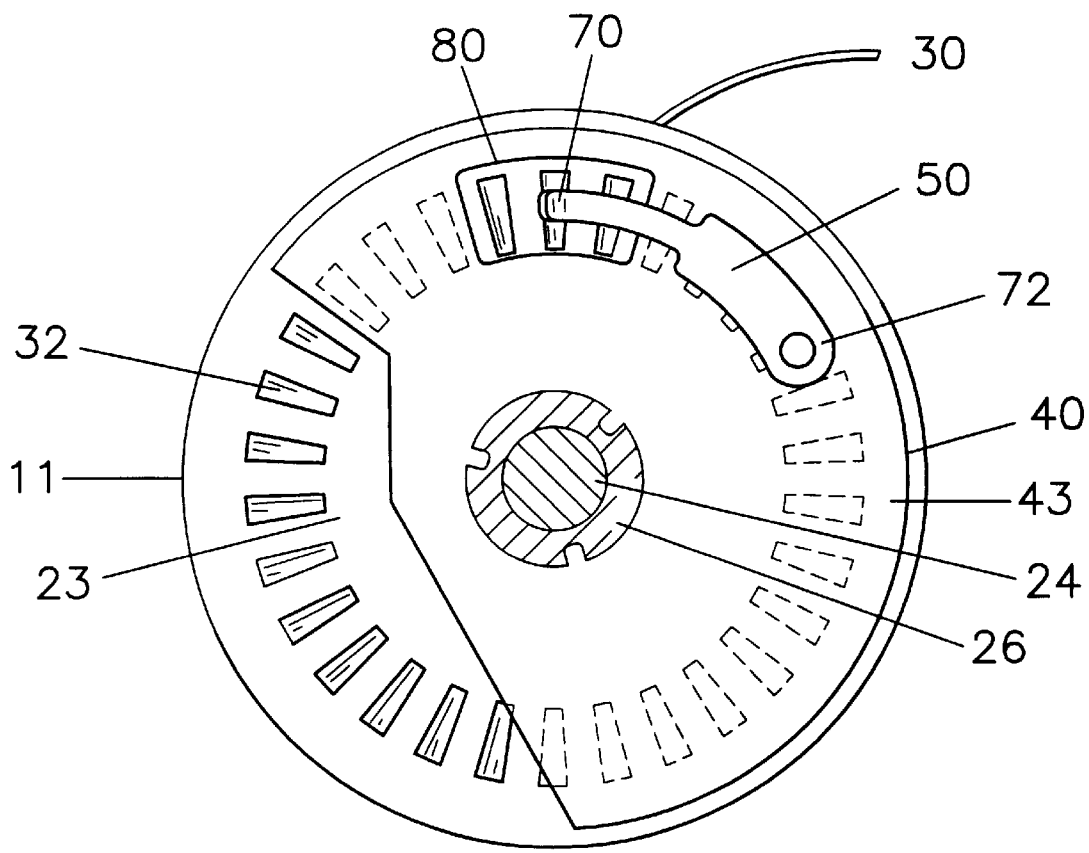
FIG. 3 is a back view of disk drag mounted spring partially broken away to expose the invention as engaged with a spool.

FIG. 3 is a back view of the disk drag 40 partially broken away to expose the invention as engaged with the spool 11; the spring 50 is conventionally mounted 72 to the disk drag 40, whereby the free end 70 engages the spool serrations 32. As illustrated in FIG. 3, it can be seen that the free end 70 of the spring 50 extends through an opening 80 in the disk drag 40 permitting disk drag engagement against the spool 11 beyond the spool serrations 32 thereby giving the designer a drag surface equal to or less than the diameter of the spool 11 from which to choose the drag action desired.

Figure 4:
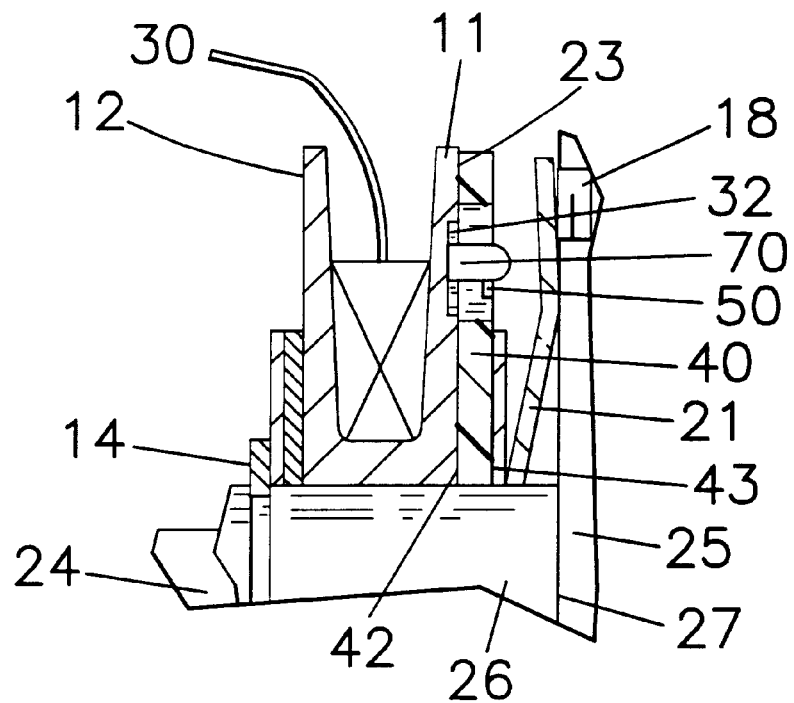
FIG. 4 is a cross-sectional view of a first alternate embodiment of the disk drag and spring which may be employed in the reel of FIG. 1.

FIG. 4 shows a first alternate embodiment with the forward face 42 of the disk drag 40 engaging the rearward wall 23 of the spool 11, and said disk drag 40 having a spool rotational alert spring 50 mounted thereto, with the free end 70 of the spring 50 engaging the serrations 32 on the rearward wall of the spool; a removable retainer 14 on the hub 26 axially positioning a conventional drag means against the forward wall 12 of the spool 11, permits the disk drag 40 to act against the spool 11 as adjusted by the drag adjusting mechanism 18. The disk drag 40 applying drag pressure to the rearward wall 23 of the spool 11 as the spool rotates against the disk drag 40, and the serrations 32 rotate against the free end 70 of the spring 50 as line 30 carried on the spool 11 is pulled therefrom to produce an audible alarm, alerting the user that line 30 is being withdrawn from the spool 11.

Figure 5:
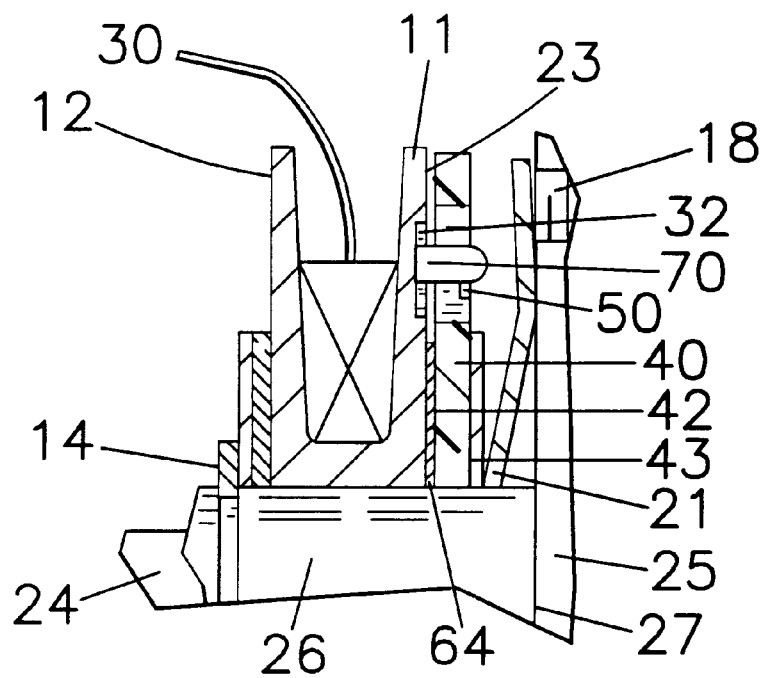
FIG. 5 is a cross-sectional view of a second alternate embodiment of the disk drag and spring which may be employed in the reel of FIG. 1.

FIG. 5 shows a second alternate embodiment of disk drag 40 and spring 50. The disk drag and spring are mounted in the same way as the disk drag and spring of FIG. 4 but provide for at least one engaging washer 64 located between the disk drag 40 and rearward wall 23 of the spool 11 for a different drag characteristic.

Figure 6:
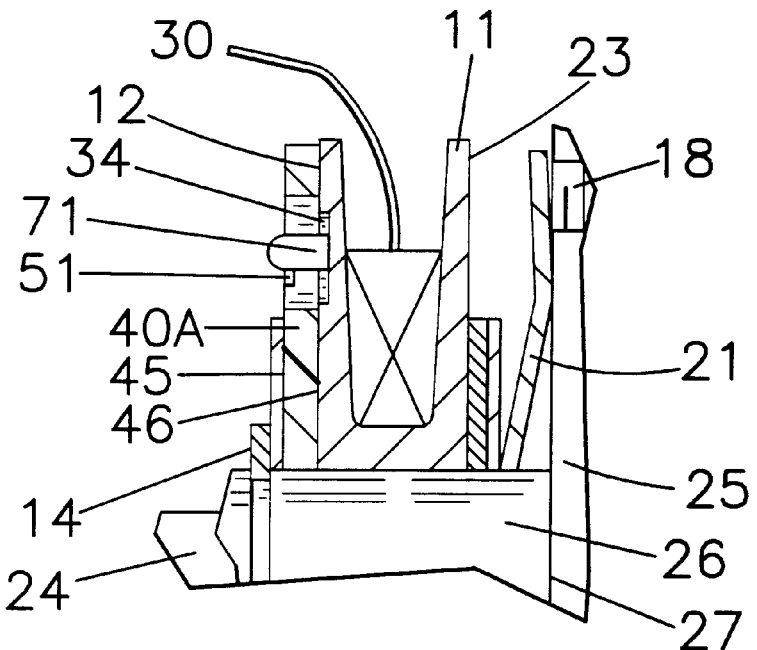
FIG. 6 is a cross-sectional view of a third alternate embodiment of the disk drag and spring which may be employed in the reel of FIG. 1.

FIG. 6 shows a third alternate embodiment with the rearward face 46 of the disk drag 40A engaging the forward wall 12 of the spool 11, and said disk drag 40A having a spool rotational alert spring 51 mounted thereto, with the free end 71 of the spring 51 engaging the serrations 34 on the forward wall of the spool; a removable retainer 14 on the hub 26 axially positioning a conventional drag means against the rearward wall 23 of the spool 11, permits the disk drag 40A to act against the spool 11 as adjusted by the drag adjusting mechanism 18. The disk drag 40A applying drag pressure to the forward wall 12 of the spool 11 as the spool rotates against the disk drag 40A, and the serrations 34 rotate against the free end 71 of the spring 51 as line 30 carried on the spool 11 is pulled therefrom to produce an audible alarm, alerting the user that line 30 is being withdrawn from the spool 11.

Figure 7:
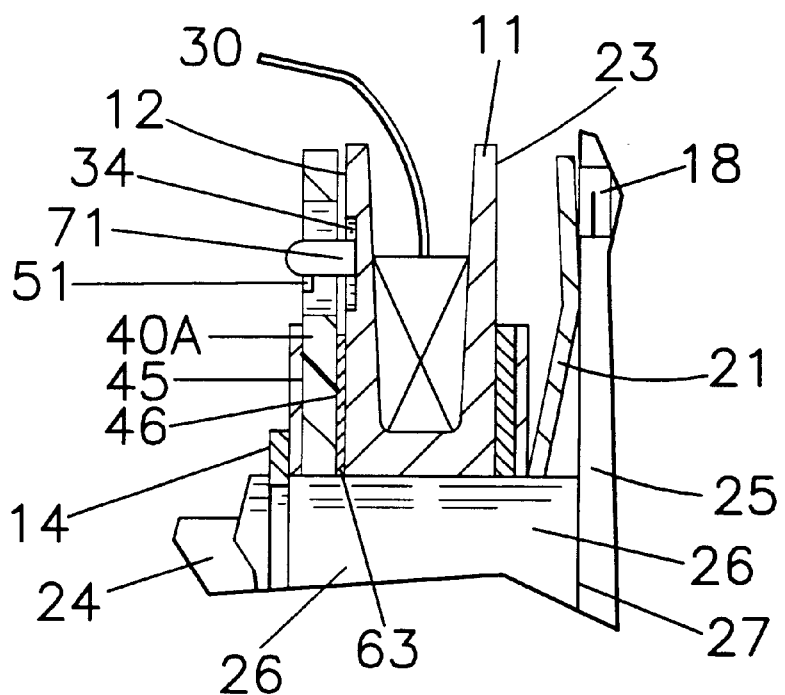
FIG. 7 is a cross-sectional view of a fourth alternate embodiment of the disk drag and spring which may be employed in the reel of FIG. 1.

FIG. 7 shows a fourth alternate embodiment of disk drag 40A and spring 51. The disk drag and spring are mounted in the same way as the disk drag and spring of FIG. 6 but provide for at least one engaging washer 63 located between the disk drag 40A and forward wall 12 of the spool 11 for a different drag characteristic.

Figure 8:
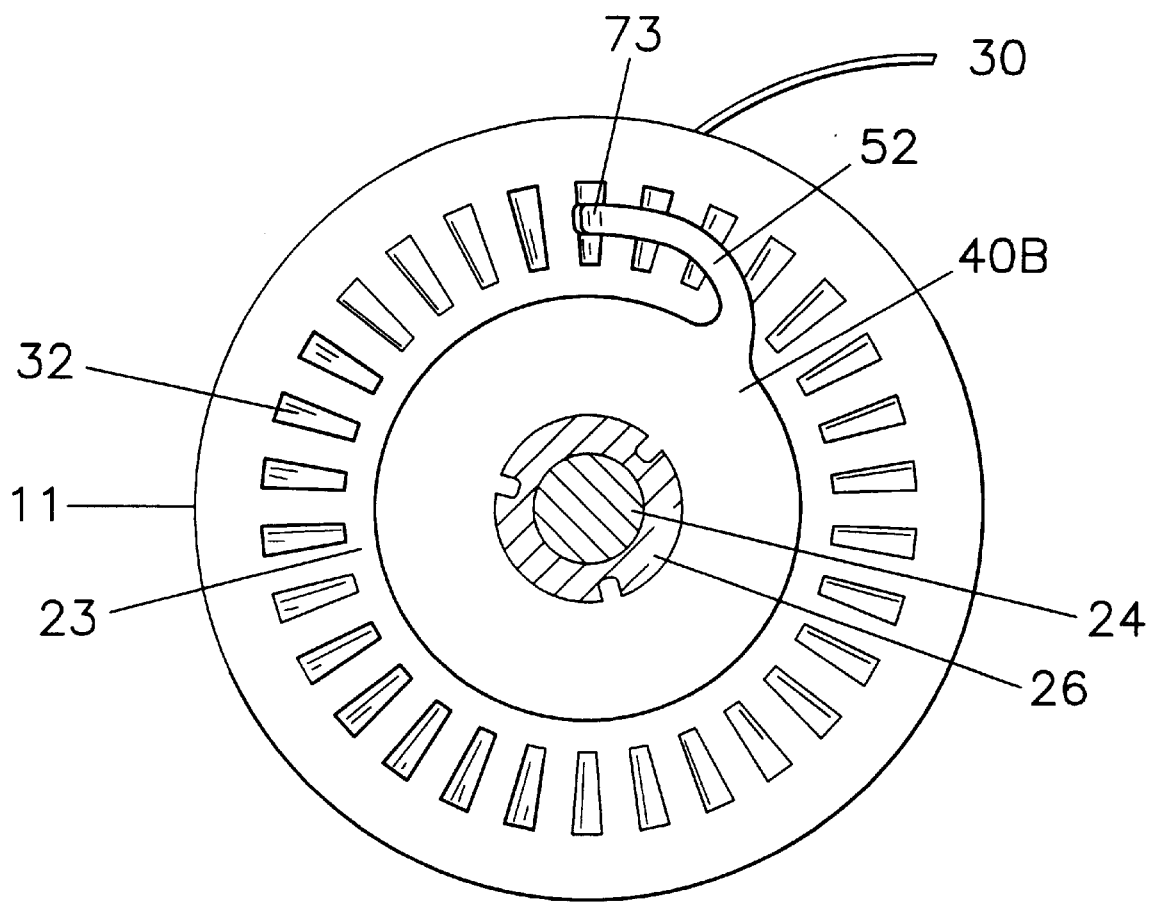
FIG. 8 is a view of the disk drag and spring with an alternate design which may be employed in the reel of FIG. 1.

The disk drag 40B of FIG. 8 is supported in the same way as the disk drags of FIG. 1, but provides a different drag characteristic with a different arrangement of mounting the spring 52 to the disk drag 40B whereby the free end 73 of the spring 52 engages the spool serrations 32; a view of the integrally formed disk drag and spring as a one piece member, illustrating that generally the disk drag and spring are determined by economy of manufacture.

While there has hereinabove been disclosed, described and depicted the currently preferred embodiment of the present invention, it should be understood that such was done for purposes of explanation and elucidation only and that certain changes, modifications, additions, deletions and improvements may be made thereto, within the scope of the claims hereinunder appended.

What I claim is:

1. In a spin-cast fishing reel comprising:
a reel body, said body having a deck plate, a fixed hub supported by and projecting forward of said deck plate, a rotatable line carrying spool supported on said hub, said spool having annulary disposed serrations about the rearward wall, a non-rotatable disk drag having a forward face, and said disk drag acts against said rearward wall of said spool as adjusted by a drag adjusting means, the improvement comprising:
said disk drag having a spool rotational alert spring mounted thereto, and
said spring having a free end, and wherein said disk drag supported on said hub, and
said free end of said spring having preset pressure against said serrations, and wherein
said forward face of said disk drag applying drag pressure to said rearward wall of said spool, and
said preset spring pressure remains constant against said serrations as drag pressure is increased and decreased.

2. The spin-cast fishing reel as claimed in claim 1, wherein at least one engaging washer is located between said disk drag and said rearward wall of said spool.

3. In a spin-cast fishing reel comprising:
a reel body, said body having a deck plate, a fixed hub supported by and projecting forward of said deck plate, a rotatable line carrying spool supported on said hub, said spool having annulary disposed serrations about the forward wall, a non-rotatable disk drag having a rearward face, and said disk drag acts against said forward wall of said spool as adjusted by a drag adjusting means, the improvement comprising:
said disk drag having a spool rotational alert spring mounted thereto, and
said spring having a free end, and wherein
said disk drag supported on said hub, and
said free end of said spring having preset pressure against said serrations, and wherein
said rearward face of said disk drag applying drag pressure to said forward wall of said spool, and
said preset spring pressure remains constant against said serrations as drag pressure is increased and decreased.

4. The spin-cast fishing reel as claimed in claim 3, wherein at least one engaging washer is located between said disk drag and said forward wall of said spool.

* * * * *